United States Patent
Zhou et al.

(10) Patent No.: US 8,914,321 B2
(45) Date of Patent: Dec. 16, 2014

(54) LEARNING WITH NOISY LABELS FROM MULTIPLE JUDGES

(71) Applicant: Microsoft Corporation, Redmond, WA (US)

(72) Inventors: Dengyong Zhou, Redmond, WA (US); Sumit Basu, Seattle, WA (US); Yi Mao, Redmond, WA (US); John C. Platt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 13/757,845

(22) Filed: Feb. 3, 2013

(65) Prior Publication Data
US 2014/0222747 A1    Aug. 7, 2014

(51) Int. Cl.
*G06N 5/02* (2006.01)
*G06N 5/04* (2006.01)

(52) U.S. Cl.
CPC *G06N 5/025* (2013.01); *G06N 5/04* (2013.01); *G06N 5/046* (2013.01)
USPC ............................................. 706/52; 706/45

(58) Field of Classification Search
None
See application file for complete search history.

(56) References Cited

U.S. PATENT DOCUMENTS

2012/0088220 A1   4/2012   Feng et al.
2012/0265573 A1   10/2012  Van Pelt et al.

OTHER PUBLICATIONS

Williams, Bayesian Learning for Efficient Visual Inference, Doctoral Thesis, University of Cambridge, 2005, pp. 1-162.*
McDowell, et al., Cautious Collective Classification, Journal of Machine Learning Research 1 (2009), pp. 1-63.*
Zhou, et al., "Learning from the Wisdom of Crowds by Minimax Entrophy", Retrieved at <<http://research.microsoft.com/pubs/175659/crowdwisdom.pdf>>, Retrieved Date: Nov. 23, 2012, pp. 9.
Raykar, et al., "Ranking Annotators for Crowd Sources Labeling Tasks", Retrieved at <<http://books.nips.cc/papers/files/nips24/NIPS2011_1026.pdf>>, Neural Information Processing Systems Conference, Dec. 11, 2011, pp. 9.
Ipeirotis, et al., "Quality Management on Amazon Mechanical Turk", Retrieved at <<http://people.stern.nyu.edu/panos/publications/hcomp2010.pdf>>, ACM SIGKDD Workshop on Human Computation, Jul. 25, 2010, pp. 4.
Hosseini, et al., "On Aggregating Labels from Multiple Crowd Workers to Infer Relevance of Documents", Retrieved at <<http://www0.cs.ucl.ac.uk/staff/ingemar/Content/papers/2012/ECIR2012.pdf>>, 34th European conference on Advances in Information Retrieval, Apr. 1, 2012, pp. 13.

(Continued)

*Primary Examiner* — Wilbert L Starks
(74) *Attorney, Agent, or Firm* — David Andrews; Sandy Swain; Micky Minhas (57) ABSTRACT

A system and method infer true labels for multiple items. The inferred labels are generated from judgments. Multiple judges select the judgments from a specified choice of labels for each item. The method includes determining a characterization of judge expertise and item difficulties based on the judgments. The method also includes determining, using maximum entropy, a probability distribution over the specified choice of labels for each judge and item, based on the judgments. The method further includes selecting improved labels for the items from the specified choice such that the entropy over the probability distribution is reduced. The improved labels represent an improvement from the judgments toward the true labels. Additionally, the method includes performing iterative procedure to determine the true labels, the characterizations of judge expertise and the labeling difficulties.

20 Claims, 5 Drawing Sheets

(56) References Cited

OTHER PUBLICATIONS

Le, et al., "Ensuring Quality in Crowdsourced Search Relevance Evaluation: The Effects of Training Question Distribution", Retrieved at <<http://ir.ischool.utexas.edu/cse2010/materials/leetal.pdf>>, In SIGIR 2010 Workshop on Crowdsourcing for Search Evaluation, Jul. 19, 2010, pp. 4.

Altun, et al., "Unifying Divergence Minimization and Statistical Inference via Convex Duality", Retrieved at <<http://ttic.uchicago.edu/~altun/pubs/AltSmo-COLT06.pdf>>, In 19th Annual Conference on Learning Theory, Jun. 22, 2006, pp. 15.

Dekel, et al., "Vox Populi: Collecting High-Quality Labels from a Crowd", Retrieved at <<http://research.microsoft.com/pubs/80597/DekelSh09a.pdf>>, In Proceedings of the 22nd Annual Conference on Learning Theory, Jun. 18, 2009, pp. 10.

Deng, et al., "ImageNet: A large-scale Hierarchical Image Database", Retrieved at <<http://image-net.org/papers/imagenet_cvpr09.pdf>>, In Proceedings of the IEEE Conference on Computer Vision and Pattern Recognition, Jun. 20, 2009, pp. 8.

Dudik, et al., "Maximum Entropy Density Estimation with Generalized Regularization and an Application to Species Distribution Modeling", Retrieved at <<http://www2.research.att.com/~phillips/pdf/dudik07a.pdf>>, In Journal of Machine Learning Research, vol. 8, Jun. 2007, pp. 44.

Joachims, et al., "Accurately Interpreting Clickthrough Data as Implicit Feedback", Retrieved at <<http://ils.unc.edu/courses/2011_fall/inls509_001/papers/Joachims05.pdf>>. In Proceedings of the 28th Annual International ACM SIGIR Conference on Research and Development in Information Retrieval, Aug. 15, 2005, pp. 8.

Karger, et al., "Iterative Learning for Reliable Crowdsourcing Systems", Retrieved at <<http://books.nips.cc/papers/files/nips24/NIPS2011_1102.pdf>>, In Advances in Neural Information Processing Systems, Dec. 2011, pp. 9.

Lebanon, et al., "Boosting and Maximum Likelihood for Exponential Models", Retrieved at http://www.cc.gatech.edu/fac/lebanon/papers/nips01.pdf>>, In Advances in Neural Information Processing Systems, Dec. 2001, pp. 8.

Rasch, G., "On General Laws and the Meaning of Measurement in Psychology", Retrieved at http://econ.ucsb.edu/~doug/245a/Papers/Meaning%20of%20Measurement.pdf, In Proceedings of the 4th Berkeley Symposium on Mathematical Statistics and Probability, vol. 4, Nov. 26, 2012, pp. 13.

Raykar, et al., "Learning from Crowds", Retrieved at <<http://Ijsavage.wharton.upenn.edu/~Izhao/papers/MyPublication/LearningFromCrowd_JMLR_2010.pdf>>, In Journal of Machine Learning Research, vol. 4, Apr. 2010, pp. 26.

Sheng, et al., "Get Another Label? Improving Data Quality and Data Mining Using Multiple, Noisy Labelers", Retrieved at <<http://storm.cis.fordham.edu/~gweiss/selected-papers/get-another-label-provost-kdd08.pdf>>, In Proceedings of the 14th ACM SIGKDD International Conference on Knowledge Discovery and Data Mining, Aug. 24, 2008, pp. 9.

Snow, et al., "Cheap and Fast—But is it Good? Evaluating Non-Expert Annotations for Natural Language Tasks", Retrieved at <<http://acl.eldoc.ub.rug.nl/mirror/D/D08/D08-1027.pdf>>, In Proceedings of the Conference on Empirical Methods in Natural Language Processing, Oct. 2008, pp. 10.

Welinder, et al., "The Multidimensional Wisdom of Crowds", Retrieved at <<http://www.vision.caltech.edu/visipedia/papers/WelinderEtalNIPS10.pdf>>, In Advances in Neural Information Processing Systems, Dec. 8, 2010, pp. 9.

Whitehill, et al., "Whose Vote Should Count More: Optimal Integration of Labels from Labelers of Unknown Expertise", Retrieved at <<http://books.nips.cc/papers/files/nips22/NIPS2009_0100.pdf>>, In Advances in Neural Information Processing Systems, Dec. 2009, pp. 9.

\* cited by examiner

FIG. 5

LEARNING WITH NOISY LABELS FROM MULTIPLE JUDGES

BACKGROUND

A classification problem is the attempt to identify the class of each of a set of items. Solving classification problems involves making a judgment about the class of an item. The judge provides labels for each item identifying the item's class. A machine learning model can be trained based on these judgments to perform the classification. The appropriate label for an item is selected from the provided labels, based on specific criteria or algorithms. For example, in email services, users report spam emails to the email server that misclassified the spam as a regular email. Reporting spam is a way of labeling specific emails as spam. This labeling is a form of crowdsourcing for the classification problem of distinguishing regular email from spam. A classifier can then be trained from the labeled spam.

Crowdsourcing is a process where the labeling task is outsourced to a distributed group of judges who provide labels at little to no cost. Each judge classifies, i.e., labels, a set of items. The labels provided by the crowd are analyzed in an attempt to identify the correct labels. Crowdsourcing can provide a large number of labels at a relatively low cost. However, in crowdsourcing, the judges are non-experts. Thus, the labels from a crowd are usually noisy. Because each item is labeled by multiple judges who do not typically agree unanimously, the judgments are combined to produce a single label for the item this can be done in a variety ways, and a typical one is majority voting. While labels provided by an expert could be more accurate, the cost would be higher. Thus, because labels inferred from crowds in this way could be highly noisy, there has been an increasing interest in developing techniques for computing higher quality labels from crowdsourced judgments.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for determining a plurality of inferred labels, for a corresponding plurality of items. The inferred labels are generated from a plurality of judgments. Multiple judges select the judgments from a specified choice of labels for each of the items. The method includes determining, using maximum entropy, a probability distribution of the specified choice of label set for each judge and item, based on the judgments and a plurality of initial labels. The method also includes determining expertise and labeling difficulty for each judge based on the choice of labels and the judgment. The method further includes selecting improved labels for the items from the specified choice such that the entropy over the probability distribution is reduced.

Additionally, the claimed subject matter includes a computer-readable storage media. The computer-readable storage media includes code configured to direct a processor to determine, using maximum entropy, a probability distribution of the specified choice of labels for each judge and item, based on the judgments and a plurality of initial labels. The probability distribution represents how the judges generate labels for items. The code is configured to determine an expertise for each of the judges based on the probability distribution. The expertise of each judge represents a relative expertise in relation to all other judges, and is independent of particular items the judge labels. The code is configured to determine a labeling difficulty for each of the items based on the probability distribution. The labeling difficulty for each of the items represents a relative difficulty in comparison to all other items. The labeling difficulty for an item is independent of particular judges labeling the item.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term, processor, is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

1. Introduction

One approach to inferring labels from noisy judgments, such as those provided by crowdsourcing, is called majority voting. In general, majority voting is more accurate than individual judges in determining the true labels. However, majority voting considers each judge independently for each item, without regard to whether the judges labeling the item have different expertise. In other words, all votes are treated equally, with the majority vote winning out.

One embodiment of the claimed subject matter determines inferred labels over noisy judgments. Multiple judges select the judgments from a specified choice for each item. Using maximum entropy, a probability distribution of the specified choices for each judge and item is determined. Based on the probability distribution, an expertise for each of the judges, and a labeling difficulty for each of the items, and a set of improving labels for the items are inferred by minimum entropy.

It is noted that crowdsourcing is merely one example of a classification problem with noisy judgments. However, noisy judgments exist in various classification problems. Another example classification problem could be deciding whether to buy stocks based on ratings from multiple analysts. In such a problem, the analysts are the judges, each providing noisy judgments on an overlapping set of stocks. Yet another example classification problem involves determining true measurements of electro-mechanical systems, where noisy measurements come from a bank of noisy sensors. These examples are discussed to illustrate the point that the claimed subject matter can be applied in various applications with noisy judgments. For the sake of clarity, however, the following discussion uses crowdsourced classification problems as one example application.

Figure 1:
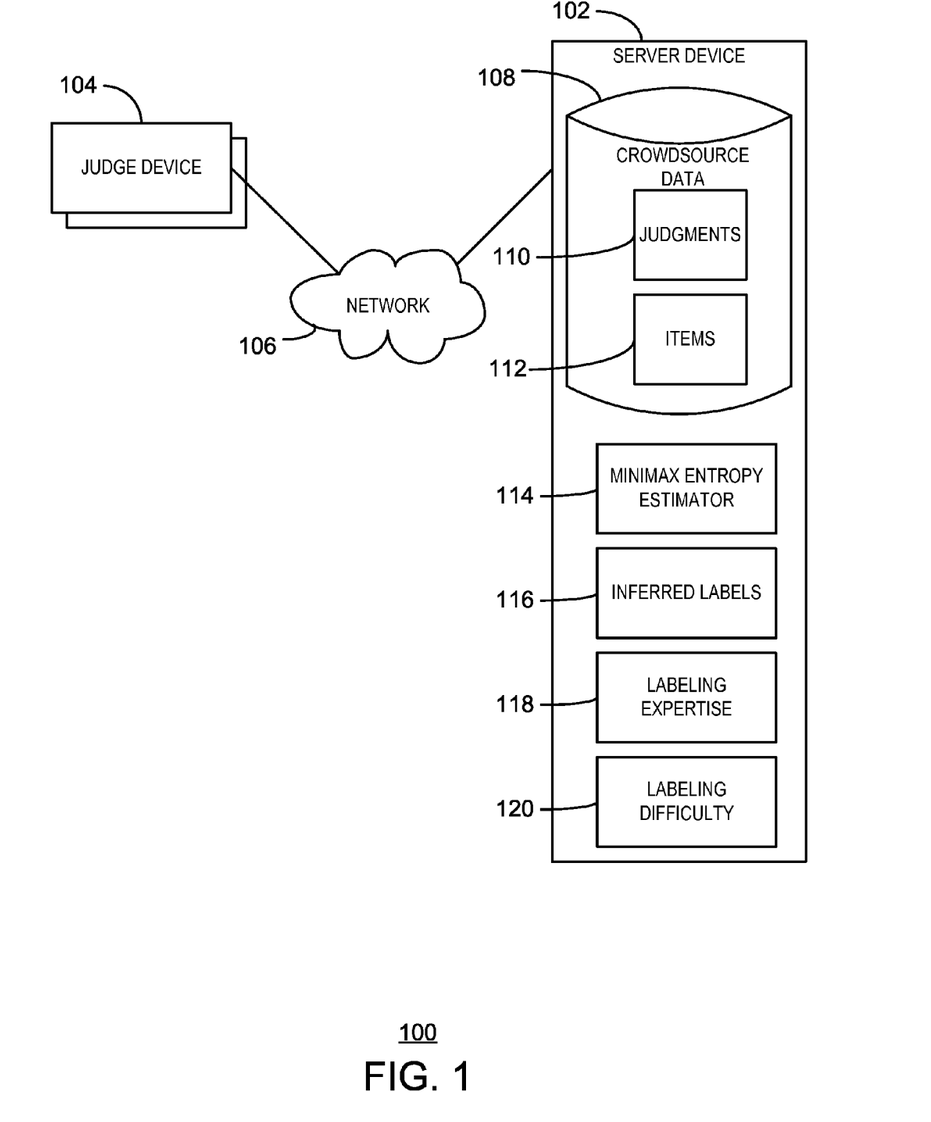
FIG. 1 is a system for resolving a crowdsourced classification problem, operating in accordance with the claimed subject matter.

FIG. 1 is a system 100 for resolving a crowdsourced classification problem, operating in accordance with the claimed subject matter. The system 100 includes a server device 102 and judge devices 104, in communication over a network 106.

The server device 102 may include a web server, cloud server, or other computing architecture capable of crowdsourcing a classification problem to judge devices 104. The judge devices 104 may include desktop computers or mobile computing devices, such as smartphones, computer tablets, or other devices operated by mobile users. The network 106 may include any network or combination of networks that facilitate communication between the server device 102 and judge devices 104, as described herein. The network 106 may include local area networks, wireless networks, wide area networks, and so on. In one embodiment, the network 106 is the Internet.

The server device 102 includes crowdsourced data 108. The crowdsourced data 108 includes judgments 110 provided by the crowdsourced judge devices 104 for items 112. It is understood that not all judge devices 104 provide labels for all items 112. The server device 102 also includes a minimax entropy estimator 114. The estimator 114 determines a set of new labels 116 for the items 112 that have improved accuracy over the judgments 110. The estimator 114 determines the expertise 118 and task difficulty 120 based on the crowdsourced data 108. The expertise 118 is an objective judge expertise, independent of the classification task performed by the judge. For example, two judges may be tasked with labeling an item 112, such as a newspaper article. The task could be to label the article as a machine learning article, or a statistics article. One of the judges may have a background in statistics, making the judge more capable of distinguishing between articles about machine learning and statistics. Thus, the relative comparison of the judges' expertise 118 is intrinsic to the judges, and does not vary based on the content of each article. Further, the judges' expertise 118 is not a single number, but a matrix representing the probability of judges confusing pairs of classes.

Similarly, an objective task difficulty 120 is independent of the judge performing the task. For example, given two newspaper articles, one could be more similar to a statistics article than the other. Thus, the difficulty of labeling any article as statistics or machine learning is intrinsic to the article being judged. The difficulty 120 of labeling any article does not vary according to the judge performing the task.

2. Minimax Entropy Principle

Figure 2:
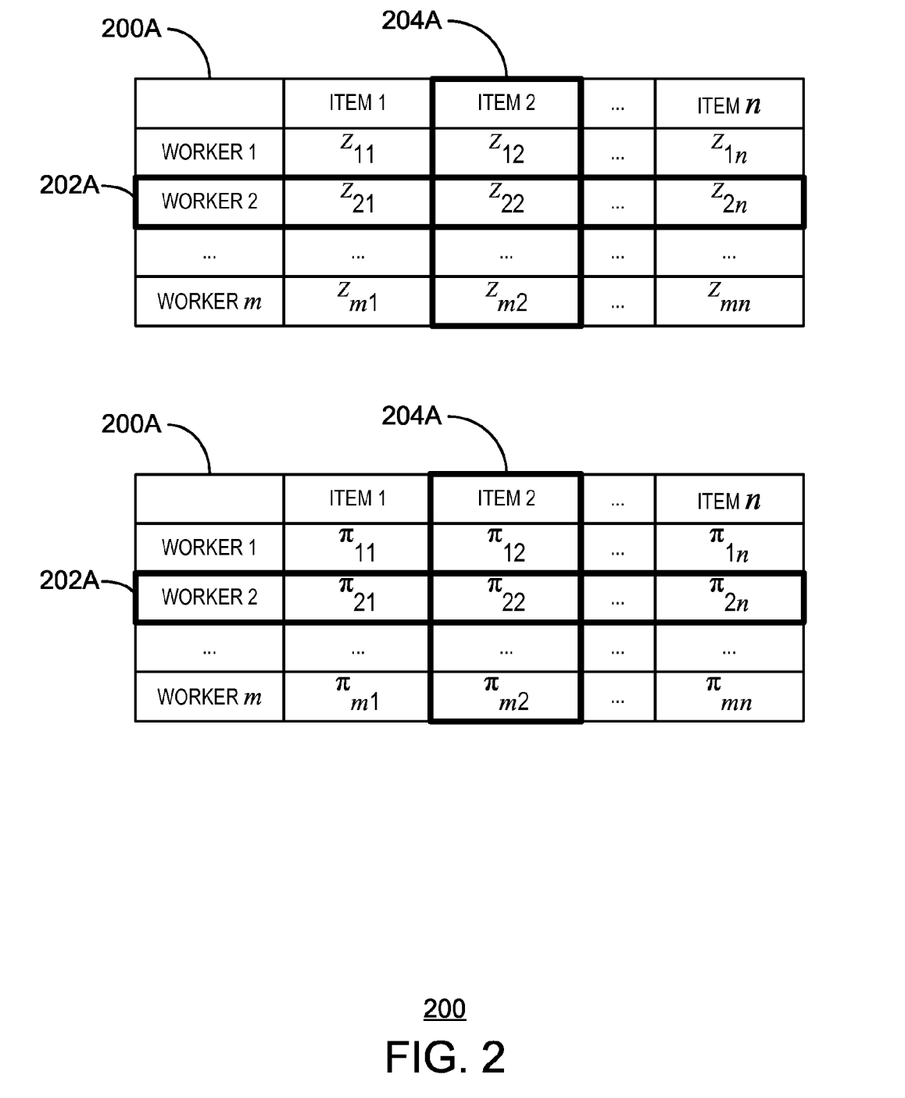
FIG. 2 is a representation of two matrices, labels and probability distribution, for resolving a crowdsourced classification problem, in accordance with the claimed subject matter.

FIG. 2 is a representation of two matrices, labels 200A and probability distribution 200B, for resolving a crowdsourced classification problem, in accordance with the claimed subject matter. In labels 200A, and distribution 200B, each row corresponds to a judge, indexed by i (from 1 to m). Each column corresponds to an item, indexed by j (from 1 to n). The labels 200A, $z_{ijk}$ represent the labels provided by each judge, i, for each item, j. The distribution 200B represents the underlying probability distribution that each judge, i, provides the given label for each item, j. The shaded rows 202A, 202B and columns 204A, 204B indicate that rows 202A, 202B and columns 204A, 204B of the distributions are constrained by sums over observations, for example, some row sums and column sums.

Each item 112 has an actual, true label, which is unknown. The accurate labels (not shown), can be represented as a vector. The values of the vector $y_{jl}$, are 1 when item j is in class l (from 1 to c), and 0 otherwise. Thus, generally speaking, vector $y_{jl}$ can be treated as the probability that item j is in class l. Further, given the labels 200A, $z_{ijk}$, a three-dimensional tensor $z_{ijk}$ can be determined. A tensor is a multi-dimensional generalization of a matrix, just as a matrix is a 2-dimensional generalization of a vector. The tensor $z_{ijk}$ is represents the relationship between the labels 200A and the probability distribution matrix. In this case, the tensor's entry $z_{ijk}$ is 1 when judge i labels item j as class k, and 0 otherwise.

Assume that $z_{ijk}$ are drawn from $\pi_{ij}$, which is the distribution over all possible labels for what label the judge assigns to this item. For instance, if the true label is, "A," and the other choices are "B" and "C," one possible the distribution is: A: 50%, B: 25%, and C: 25%. The probability the judge selects the true label is 50%, but the whole distribution over answers is estimated. Similar to the labels 200A, $z_{ijk}$, the distribution 200B, $\pi_{ij}$ can be used to determine a tensor $\pi_{ijk}$, which is the probability that judge i labels item j as class k.

The distributions 100B, $\pi_{ij}$ may be derived through the maximum entropy principle. The maximum entropy principle helps avoid assumptions by maintaining as much uncertainty as possible while still satisfying the constraints supplied by observations. Thus, the form of the distributions 100B $\pi_{ij}$ may be derived by constraining $\pi_{ij}$ per column, and constraining the number of labels per class per item, $\Sigma_i z_{ijk}$, to be equal to the sum of the likelihood of those labels $\Sigma_i \pi_{ijk}$. Further constraining the $\pi_{ij}$ per row, and constraining an empirical confusion matrix per judge, $\Sigma_i y_{jl} z_{ijk}$, to match $\Sigma_i y_{jl} \pi_{ijk}$. This approach provides a maximum entropy model for $\pi_j$ given $y_{jl}$, that can be represented by Formulas 1 and 2:

$$\max_{\pi} -\sum_{i=1}^{m}\sum_{j=1}^{n}\sum_{k=1}^{c} \pi_{ijk} \ln \pi_{ijk} \tag{1}$$

$$\text{s.t.} \sum_{i=1}^{m}\pi_{ijk} = \sum_{i=1}^{m} z_{ijk}, \forall j, k, \sum_{j=1}^{n} y_{jl}\pi_{ijk} = \sum_{j=1}^{n} y_{jl}z_{ijk}, \forall i, k, l,$$

$$\sum_{k=1}^{c}\pi_{ijk} = 1, \forall i, j, \pi_{ijk} \geq 0, \forall i, j, k. \tag{2}$$

To estimate the new labels 110, $y_{jl}$, the entropy of $\pi_{ijk}$ is minimized in Formula 2. This minimization makes $\pi_{ij}$ peak, which means that $z_{ijk}$ is the least random variable given $y_{jl}$. Thus, the inference for $y_{jl}$ can be expressed by a minimax entropy program, represented by Formulas 3 and 4:

$$\min_{y}\max_{\pi} -\sum_{i=1}^{m}\sum_{j=1}^{n}\sum_{k=1}^{c} \pi_{ijk} \ln \pi_{ijk} \tag{3}$$

$$\text{s.t.} \sum_{i=1}^{m}\pi_{ijk} = \sum_{i=1}^{m} z_{ijk}, \forall j, k, \sum_{j=1}^{n} y_{jl}\pi_{ijk} = \sum_{j=1}^{n} y_{jl}z_{ijk}, \forall i, k, l,$$

$$\sum_{k=1}^{c}\pi_{ijk} = 1, \forall i, j, \pi_{ijk} \geq 0, \forall i, j, k, \sum_{l=1}^{c} y_{jl} = 1, \forall j, y_{jl} \geq 0, \forall j, l. \tag{4}$$

2.1 Justification for Minimum Entropy

The new labels 116, $y_{jl}$, can be represented as a set of parameters to the judge-item label models $\pi_{ij}$. The goal in choosing the $y_{jl}$ is to select distributions 110B, $\pi_{ij}$, that are as close as possible to the actual distributions $\pi_{ij}^*$.

To find a principle to choose the $y_{jl}$, assume that the row and column measurements on the actual distributions, $\pi_{ij}^*$, are known. That is, the actual values of, the column measurements $\phi_{jk}=\Sigma_i \pi_{ijk}^*$, and row measurements, $\phi_{ikl}=\Sigma_j y_{jl}\pi_{ijk}^*$, for a chosen set of $y_{jl}$ values. Knowing these true row and column measurements, the maximum entropy principle can be applied to generate distributions $\pi_{ij}$, as shown in Formula 5:

$$\max_{\pi} -\sum_{i=1}^{m}\sum_{j=1}^{n}\sum_{k=1}^{c} \pi_{ijk} \ln \pi_{ijk} \tag{5}$$

$$\text{s.t.} \sum_{i=1}^{m} \pi_{ijk} = \phi_{jk}, \forall j, k, \sum_{j=1}^{n} y_{jl}\pi_{ijk} = \varphi_{ikl}, \forall i, k, l.$$

Let $D_{KL}(\bullet\|\bullet)$ denote the Kullback-Leibler (KL) divergence between two distributions. The KL divergence is a non-symmetric measure of the difference between two probability distributions, e.g., $\pi_{ij}$ and $\pi_{ij}^*$. The new labels 116, $y_{jl}$, can be selected to minimize a loss of distribution 100B, $\pi_{ij}$, with respect to the actual distribution, $\pi_{ij}^*$, given by Formula 6:

$$l=(\pi^*,\pi)=\Sigma_{i=1}^{m}\Sigma_{j=1}^{n}D_{KL}(\pi_{ij}^*\|\pi_{ij}). \tag{6}$$

The minimum loss can be attained by choosing $y_{jl}$ to minimize the entropy of the maximum distributions $\pi_{ij}$. This can be shown by the Lagrangian equation of Formula 5, shown in Formula 7.:

$$L=-\Sigma_{i=1}^{m}\Sigma_{j=1}^{n}\Sigma_{k=1}^{c}\pi_{ijk} \ln \pi_{ijk}+\Sigma_{i=1}^{m}\Sigma_{j=1}^{n}\lambda_{ij}$$
$$(\Sigma_{k=1}^{c}\pi_{ijk}-1)+\Sigma_{j=1}^{n}\Sigma_{k=1}^{c}\tau_{jk}\Sigma_{i=1}^{m}(\pi_{ijk}-\pi_{ijk}^*)+$$
$$\Sigma_{i=1}^{m}\Sigma_{k=1}^{c}\Sigma_{l=1}^{c}\sigma_{ikl}\Sigma_{j=1}^{n}y_{jl}(\pi_{ijk}-\pi_{ijk}^*), \tag{7}$$

Where the newly introduced variables $\tau_{jk}$ and $\sigma_{ikl}$ are the Lagrange multipliers. The Lagrange multipliers help find local maxima and minima of functions that are subject to equality constraints. For a solution to be optimal, the Karush-Kuhn-Tucker (KKT) conditions must be satisfied. Thus, $$\frac{\partial L}{\partial \pi_{ijk}} = -\ln\pi_{ijk} - 1 + \lambda_{ij} + \sum_{l=1}^{c} y_{jl}(\tau_{jk} + \sigma_{ikl}) = 0,$$

$\forall i, j, k$, which can be represented as shown in Formula 8.

$$\pi_{ijk}=\exp[\Sigma_{l=1}^{c}y_{jl}(\tau_{jk}+\sigma_{ikl})+\lambda_{ij}-1], \forall i,j,k. \tag{8}$$

Being a probability measure, the variables $\pi_{ijk}$ satisfy Formula 9:

$$\Sigma_{k=1}^{c}\pi_{ijk}=\Sigma_{k=1}^{c}\exp[\Sigma_{l=1}^{c}y_{jl}(\tau_{jk}+\sigma_{ikl})+\lambda_{ij}-1]=1, \forall i,j. \tag{9}$$

Eliminating $\lambda_{ij}$ by jointly considering Formulas 8 and 9, a labeling model is obtained in the exponential family, as shown in Formula 10:

$$\pi_{ijk} = \frac{\exp\sum_{l=i}^{c} y_{jl}(\tau_{jk} + \sigma_{ikl})}{\sum_{s=1}^{c}\exp\sum_{l=1}^{c} y_{jl}(\tau_{js} + \sigma_{isl})}, \tag{10}$$

$\forall i, j, k$.

Plugging Formula 10 into Formula 6, and performing some algebraic manipulations, the following theorem can be proven. Theorem 2.1: Let $\pi_{ij}$ be the maximum entropy distributions in Formula 5. Then, $l(\pi^*,\pi)=\Sigma_{i=1}^{m}\Sigma_{j=1}^{n}\Sigma_{k=1}^{c}(\pi_{ijk}^*\ln \pi_{ijk}^*-\pi_{ijk}\ln \pi_{ijk})$. The second term is the only term that depends on $y_{jl}$. Therefore, the new labels 116, $y_{jl}$, are selected to minimize the entropy of the maximum entropy distributions.

The labeling model expressed by Formula 10 has a natural interpretation. For each judge, i, the multiplier set $\{\sigma_{ikl}\}$ is a measure of expertise 118, while for each item 112, j, the multiplier set $\{\tau_{jk}\}$ is a measure of its confusability, i.e., task difficulty 120. A judge correctly labels an item 112 either because of the judge's useful expertise 118 or because of the item's low difficulty 120. When the item 112 or judge parameters are shifted by an arbitrary constant, the probability given by Formula 10 does not change. The redundancy of the constraints in Formula 3 causes the redundancy of the parameters.

3. Constraint Relaxation

In crowdsourcing applications, each item 112 is usually labeled only a few times. Moreover, a judge usually only labels a small subset of items 112 rather than all. In such cases, it may not be reasonable to expect that the constraints of Formula 3, hold for the underlying distributions 100B, $\pi_{ij}$. As such, the optimization problem is relaxed to prevent overfitting, as shown in Formulas 11 and 12:

$$\min_{y} \max_{\pi,\xi,\zeta} -\sum_{i=1}^{m}\sum_{j=1}^{n}\sum_{k=1}^{c} \pi_{ijk}\ln\pi_{ijk} - \sum_{j=1}^{n}\sum_{k=1}^{c}\frac{\xi_{jk}^2}{2\alpha_j} - \sum_{i=1}^{m}\sum_{k=1}^{c}\sum_{l=1}^{c}\frac{\zeta_{ikl}^2}{2\beta_i} \quad (11)$$

$$\text{s.t.} \sum_{i=1}^{m}(\pi_{ijk}-z_{ijk})=\xi_{jk}, \forall j,k, \sum_{j=1}^{n} y_{jl}(\pi_{ijk}-z_{ijk})=\zeta_{ikl}, \forall i,k,l,$$

$$\sum_{k=1}^{c}\pi_{ijk}=1, \forall i,j, \pi_{ijk}\geq 0, \forall i,j,k, \sum_{l=1}^{c}y_{jl}=1, \forall j, y_{jl}\geq 0, \forall j,l, \quad (12)$$

where $\alpha_j$ and $\beta_i$ are regularization parameters. It is noted that Formula 3 may be reduced to Formula 2 when the slack variables $\xi_{jk}$ and $\zeta_{ikl}$ are set to zero. The two $l_2$-norm based regularization terms in the objective function force the slack variables to be not far away from zero. In the alternative, other vector or matrix norms, such as the $l_1$-norm and the trace norm, can be applied instead. For the sake of simplicity, the following discussion references the $l_2$-norm.

The justification for minimum entropy discussed in Section 2.1 can be extended to the regularized minimax entropy formulation, Formula 3 with minor modifications. Instead of knowing the exact marginals, $\pi_{ij}$ is selected based on noisy marginals: as shown in Formula 13:

$$\phi_{jk}=\Sigma_{i=1}^{m}\pi_{ijk}^{*}+\xi_{jk}^{*},\forall j,k,\phi_{ikl}=\Sigma_{j=1}^{n}y_{jl}\pi_{ijk}^{*}+\lambda_{ikl}^{*},\forall i,k,l. \quad (13)$$

Thus the regularized entropy may be maximized, subject to the relaxed constraints, shown in Formula 14:

$$\Sigma_{i=1}^{m}\pi_{ijk}+\xi_{jk}=\phi_{jk}, \forall j,k, \Sigma_{j=1}^{n}y_{jl}\pi_{ijk}+\zeta_{ikl}=\phi_{ikl}, \forall i,k,l. \quad (14)$$

Lemma 3.1: To be the regularized maximum entropy distributions subject to Formula 14, $\pi_{ij}$ is represented as shown in Formula 10. Moreover, with regard to the slack variables, Formula 15 should be true:

$$\xi_{jk}=\alpha_j\tau_{jk}, \text{ and } \zeta_{ikl}=\beta_i\sigma_{ikl}. \quad (15)$$

The first part of the result, $\xi_{jk}$, can be verified as before. By using the labeling model in Formula 10, the Lagrangian of the regularized maximum entropy program can be written as shown in Formula 16:

$$L = -\sum_{i=1}^{m}\sum_{j=1}^{n}\ln\left(\sum_{s=1}^{c}\exp\sum_{l=1}^{c}y_{jl}(\tau_{js}+\sigma_{isl})\right) - \sum_{j=1}^{n}\sum_{k=1}^{c}\frac{\xi_{jk}^2}{2\alpha_j} - \quad (16)$$

$$\sum_{i=1}^{m}\sum_{k=1}^{c}\sum_{l=1}^{c}\frac{\zeta_{ikl}^2}{2\beta_i} + \sum_{j=1}^{n}\sum_{k=1}^{c}\tau_{jk}\left[-\sum_{i=1}^{m}\pi_{ijk}^{*}+(\xi_{jk}-\xi_{jk}^{*})\right] +$$

$$\sum_{i=1}^{m}\sum_{k=1}^{c}\sum_{l=1}^{c}\sigma_{ikl}\left[-\sum_{j=1}^{n}y_{jl}\pi_{ijk}^{*}+(\zeta_{ikl}-\zeta_{ikl}^{*})\right].$$

For fixed $\tau_{jk}$ and $\sigma_{ikl}$, maximizing the Lagrange dual over $\xi_{jk}$ and $\zeta_{ikl}$ provides the proof. By Lemma 3.1 and some algebraic manipulations, the following is proven, Theorem 3.2: Let $\pi_{ij}$ be the regularized maximum entropy distributions subject to Formula 14. Then, Formula 17 is true:

$$\ell(\pi^*,\pi) = \quad (17)$$

$$\sum_{i=1}^{m}\sum_{j=1}^{n}\sum_{k=1}^{c}\pi_{ijk}^{*}\ln\pi_{ijk}^{*} - \sum_{i=1}^{m}\sum_{j=1}^{n}\sum_{k=1}^{c}\pi_{ijk}\ln\pi_{ijk} - \sum_{j=1}^{n}\sum_{k=1}^{c}\frac{\xi_{jk}^2}{\alpha_j} -$$

$$\sum_{i=1}^{m}\sum_{k=1}^{c}\sum_{l=1}^{c}\frac{\zeta_{ikl}^2}{\beta_i} + \sum_{j=1}^{n}\sum_{k=1}^{c}\frac{\xi_{jk}^{*}\xi_{jk}}{\alpha_j} + \sum_{i=1}^{m}\sum_{k=1}^{c}\sum_{l=1}^{c}\frac{\zeta_{ikl}^{*}\zeta_{ikl}}{\beta_i}.$$

The loss cannot be minimized by minimizing the right side of Formula 17 since the random noise is unknown. However, an upper bound can be minimized instead. Formula 18 notes:

$$\xi_{jk}^{*}\xi_{jk}\leq(\xi^{*}{}_{jk}^{2}+\xi_{jk}^{2})/2, \forall j,k, \zeta_{ikl}^{*}\zeta_{ikl}\leq(\zeta^{*}{}_{ikl}^{2}+\zeta_{ikl}^{2})/2, \forall i,k,l. \quad (18)$$

Denote by $\Omega(\pi,\xi,\zeta)$ the objective function of the regularized minimax entropy program, Formula 3. Substituting the inequalities in Formula 18 into Formula 17 results in Formula 19. Thus, minimizing the regularized maximum entropy leads to minimizing an upper bound of the loss.

$$l(\pi^*,\pi)\leq\Omega(\pi,\xi,\zeta)-\Omega(\pi^*,\xi^*,\zeta^*). \quad (19)$$

4. Optimization Algorithm

A typical approach to constrained optimization is to covert the primal problem to its dual form. By Lemma 3.1, the Lagrangian of Formula 3 can be written as shown in Formula 20:

$$L = -\sum_{j=1}^{n}\ln\left[\prod_{i=1}^{m}\frac{\exp\sum_{k=1}^{c}z_{ijk}\sum_{l=1}^{c}y_{jl}(\tau_{jk}+\sigma_{ikl})}{\sum_{s=1}^{c}\exp\sum_{l=1}^{c}y_{il}(\tau_{js}+\sigma_{isl})}\right] + \quad (20)$$

$$\sum_{j=1}^{n}\sum_{k=1}^{c}\frac{\alpha_j\tau_{jk}^2}{2} + \sum_{i=1}^{m}\sum_{k=1}^{c}\sum_{l=1}^{c}\frac{\beta_i\sigma_{ikl}^2}{2}.$$

The dual problem minimizes L subject to the constraints $\Delta=\{y_{jl}|\Sigma_{l=1}^{c}y_{jl}=1, \forall j, y_{jl}\geq 0, \forall j,l\}$. This can be solved by coordinate descent with the variables being split into two groups: $\{y_{jl}\}$ and $\{\tau_{jk},\sigma_{ikl}\}$. When the variables in one group are fixed, the optimization problem on the variables in the other group is convex. When the $y_{jl}$ are restricted to be $\{0,1\}$, that is, deterministic labels, the coordinate descent procedure can be simplified. Let $$p_{jl} = \prod_{i=1}^{m} \frac{\exp\sum_{k=1}^{c} z_{ijk}(\tau_{jk} + \sigma_{ikl})}{\sum_{s=1}^{c} \exp(\tau_{js} + \sigma_{isl})}.$$

For any set of real-valued numbers $\{\mu_{jl} | \Sigma_{l=1}^{c} \mu_{jl} = 1, \forall j, \mu_{jl} > 0, \forall j, l\}$, the inequality shown in Formula 21 applies:

$$\sum_{j=1}^{n} \ln\left[\prod_{i=1}^{m} \frac{\exp\sum_{k=1}^{c} z_{ijk} \sum_{l=1}^{c} y_{jl}(\tau_{jk} + \sigma_{ikl})}{\sum_{s=1}^{c} \exp\sum_{l=1}^{c} y_{jl}(\tau_{js} + \sigma_{isl})}\right] = \tag{21}$$

$$\sum_{j=1}^{n} \ln\sum_{l=1}^{c} y_{jl} p_{jl} \text{ (deterministic labels)} = \sum_{j=1}^{n} \ln\sum_{l=1}^{c} \mu_{jl}\left(\frac{y_{jl} p_{jl}}{\mu_{jl}}\right) \geq$$

$$\sum_{j=1}^{n}\sum_{l=1}^{c} \mu_{jl} \ln\left(\frac{y_{jl} p_{jl}}{\mu_{jl}}\right) \text{ (Jensen's inequality)} =$$

$$\sum_{j=1}^{n}\sum_{l=1}^{c} \mu_{jl} \ln(y_{jl} p_{jl}) - \sum_{j=1}^{n}\sum_{l=1}^{c} \mu_{jl} \ln \mu_{jl}.$$

Plugging the last line into the Lagrangian L, obtains an upper bound of L, called F. It can be shown that $y_{jl} = \mu_{jl}$ at any stationary point of F. The optimization algorithm is a coordinate descent minimization of this F. The new labels, $y_{jl}$, may be initialized with labels based on a majority vote, shown in Formula 22. In each iteration step, optimize over $\tau_{jk}$ and $\sigma_{ikl}$, as shown in Formula 23, which can be solved by any convex optimization procedure, and next optimize over $y_{jl}$ using a simple closed form, shown in Formula 24. The optimization over $y_{jl}$ is the same as applying Bayes' theorem, where the result from the last iteration is considered a prior result. This algorithm can be shown to produce only deterministic labels. Taken together with Formulas 22 through 24, the following represents pseudocode for a Minimax Entropy Learning from Crowds Algorithm:

input $\{z_{ijk}\} \in \{0, 1\}^{m \times n \times c}$, $\tag{22}$
$\{\alpha_j\} \in \mathbb{R}_+^n$,
$\{\beta_i\} \in \mathbb{R}_+^m$ initialization $y_{jl}^0 = \dfrac{\sum_{i=1}^{m} z_{ijl}}{\sum_{i=1}^{m}\sum_{k=1}^{c} z_{ijk}}$, $\forall j, l$
for $t = 1, 2, \ldots$ $\tag{23}$ $$\{\tau_{jk}^t, \sigma_{ikl}^t\} = \arg\min_{\tau,\sigma} \sum_{i=1}^{m}\sum_{j=1}^{n}\sum_{l=1}^{c} y_{jl}^{t-1}$$

$$\left[\log\sum_{s=1}^{c} \exp(\tau_{js} + \sigma_{isl}) - \sum_{k=1}^{c} z_{ijk}(\tau_{jk} + \sigma_{ikl})\right] +$$

$$\sum_{j=1}^{n}\sum_{k=1}^{c} \frac{\alpha_j \tau_{jk}^2}{2} + \sum_{i=1}^{m}\sum_{k=1}^{c}\sum_{l=1}^{c} \frac{\beta_i \sigma_{ikl}^2}{2}$$

$$y_{jl}^t \propto y_{jl}^{t-1} \prod_{i=1}^{m} \frac{\exp\sum_{k=1}^{c} z_{ijk}(\tau_{jk}^t + \sigma_{ikl}^t)}{\sum_{s=1}^{c} \exp(\tau_{js}^t + \sigma_{isl}^t)}, \tag{24}$$

$\forall j, l$
output: $\{y_{jl}^t\}$

Minimax Entropy Learning from Crowds Algorithm

5. Measurement Objectivity Principle

The measurement objectivity principle means: (1) a comparison of task difficulty 120 between two items 112 is independent of which particular judges are included for the comparison, and (2) symmetrically, a comparison of labeling expertise between two judges is independent of which particular items 112 are included for the comparison. The first statement is about the objectivity of task difficulty 120. The second statement is about the objectivity of judge expertise 118. The following discussion mathematically defines the measurement objectivity principle. For deterministic labels, the labeling model in Formula 10 can be recovered from the measurement objectivity principle.

From Formula 10, given item j in class l, the probability that judge i labels item j as class k is shown in Formula 25:

$$\pi_{ijkl} = \frac{\exp(\tau_{jk} + \sigma_{ikl})}{\sum_{s=1}^{c} \exp(\tau_{js} + \sigma_{isl})}. \tag{25}$$

Assume that a judge, i, has labeled two items j and j', both of which are from the same class, l. With respect to the given judge i, for each item j, the task difficulty 120 for class k is given by Formula 26:

$$\rho_{ijk} = \frac{\pi_{ijkl}}{\pi_{ijll}}, \rho_{ij'k} = \frac{\pi_{ij'kl}}{\pi_{ij'll}}. \tag{26}$$

For comparing the item confusabilities, we compute a ratio between them. To maintain the objectivity of confusability, the ratio should not depend on whichever judge is involved in the comparison. Hence, given another judge i', Formula 27 holds:

$$\left(\frac{\pi_{ijkl}}{\pi_{ijll}}\right) \bigg/ \left(\frac{\pi_{ij'kl}}{\pi_{ij'll}}\right) = \left(\frac{\pi_{i'jkl}}{\pi_{i'jll}}\right) \bigg/ \left(\frac{\pi_{i'j'kl}}{\pi_{i'j'll}}\right). \tag{27}$$

It is straightforward to verify that the labeling model in Formula 25 satisfies the objectivity requirement given by Formula 27. It can also be show that a labeling model which satisfies Formula 27 is expressed by Formula 25. Formula 27 can be re-written as Formula 28:

$$\frac{\pi_{ijkl}}{\pi_{ijll}} = \frac{\pi_{ij'kl}}{\pi_{ij'll}} \frac{\pi_{i'jkl}}{\pi_{i'jll}} \frac{\pi_{i'j'll}}{\pi_{i'j'kl}}. \qquad (28)$$

Without loss of generality, choose i'=0 and j'=0 as the fixed references such that:

$$\frac{\pi_{ijkl}}{\pi_{ijll}} = \frac{\pi_{i0kl}}{\pi_{i0ll}} \frac{\pi_{0jkl}}{\pi_{0jll}} \frac{\pi_{00ll}}{\pi_{00kl}}. \qquad (29)$$

Assume that the referenced judge, 0 chooses a class uniformly at random for the referenced item 0. Thus, $\pi_{00ll}=\pi_{00kl}=1/c$. Formula 29 implies $\pi_{ijkl} \propto \pi_{i0kl}\pi_{0jkl}$. Reparameterizing with $\pi_{i0kl}=\exp(\sigma_{ikl})$ and $\pi_{0jkl}=\exp(\tau_{jk})$ (note that l is dropped since it is determined by j), then, $\pi_{ijkl} \propto \exp(\tau_{jk}+\sigma_{ikl})$. Thus, the labeling model in Formula 25 has been recovered.

Symmetrically, it is also possible to start from the objectivity of judge expertise 118 to recover the labeling model in Formula 25. Assume that two judges, i and i', have labeled a common item j from class l. With respect to the given item j, for each judge, the task difficulty is measured from class l to k by Formula 30:

$$\rho_{ijk} = \frac{\pi_{ijkl}}{\pi_{ijll}}, \qquad (30)$$

$$\rho_{i'jk} = \frac{\pi_{i'jkl}}{\pi_{i'jll}}.$$

For comparing judge expertise 118 between judges, a ratio is computed between the two judges. To maintain the objectivity of expertise, the ratio does not depend on the item being labeled. Hence, given another item j' in class l, Formula 31 holds:

$$\left(\frac{\pi_{ijkl}}{\pi_{ijll}}\right) \Big/ \left(\frac{\pi_{ij'kl}}{\pi_{ij'll}}\right) = \left(\frac{\pi_{ij'kl}}{\pi_{ij'll}}\right) \Big/ \left(\frac{\pi_{i'j'kl}}{\pi_{i'j'll}}\right). \qquad (31)$$

Note that Formula 31 is a rearrangement of Formula 27.

Figure 3:
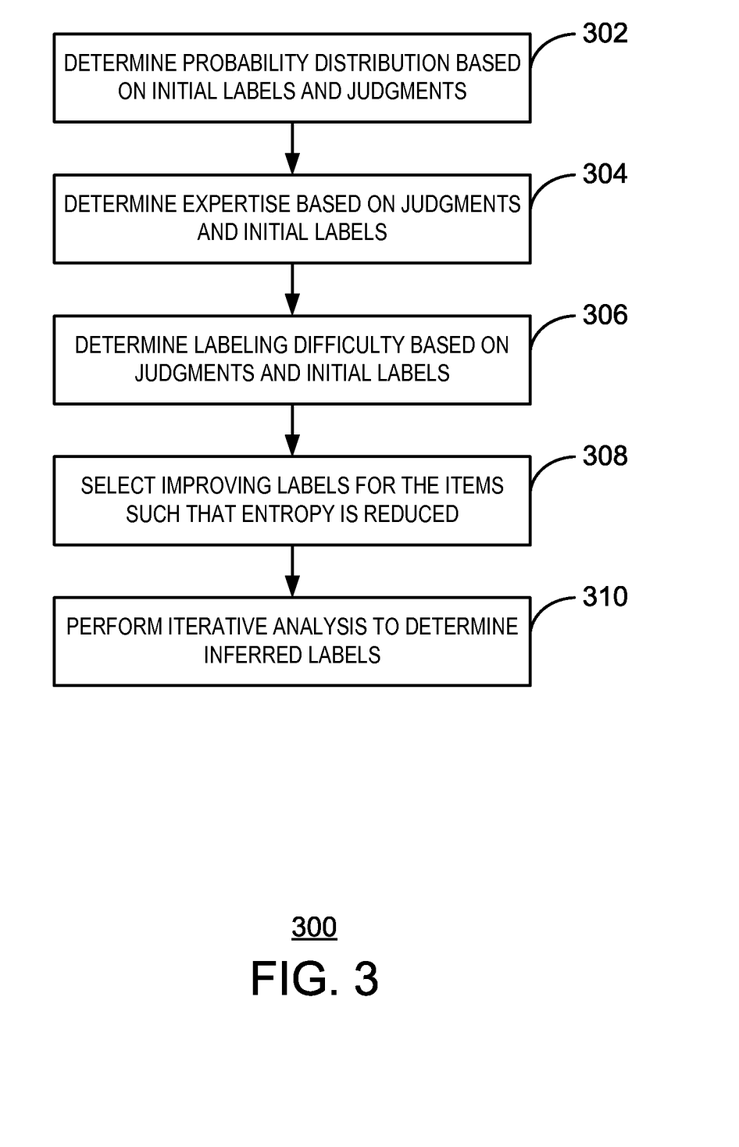
FIG. 3 is a process flow diagram of a method for resolving a crowdsourced classification problem, in accordance with the claimed subject matter.

FIG. 3 is a process flow diagram of a method 300 for resolving a crowdsourced classification problem, in accordance with the claimed subject matter. The method 300 may be performed by the minimax estimator 114. It is noted that the process flow diagram is not intended to indicate a particular order of execution. The method 300 begins at block 302, where the estimator 114 determines, using maximum entropy, a probability distribution of the specified choice of labels for each judge and item, based on the judgments 110 and initial labels. The initial labels may be selected by a majority vote process.

At block 304, the estimator 114 determines judge expertise 118 for each judge, and task difficulty 120 for each item 112, based on the probability distribution. At block 306, the estimator 114 characterizes the probability distribution, expertise, and task difficulty, over all judges and items. At block 308, the estimator selects improving labels for the items 112 from the specified choice of labels such that the entropy is reduced. At block 310, the estimator 114 performs an iterative analysis to determine the new labels 116 by minimizing entropy of the improving labels over all the specified choices of labels.

Figure 4:
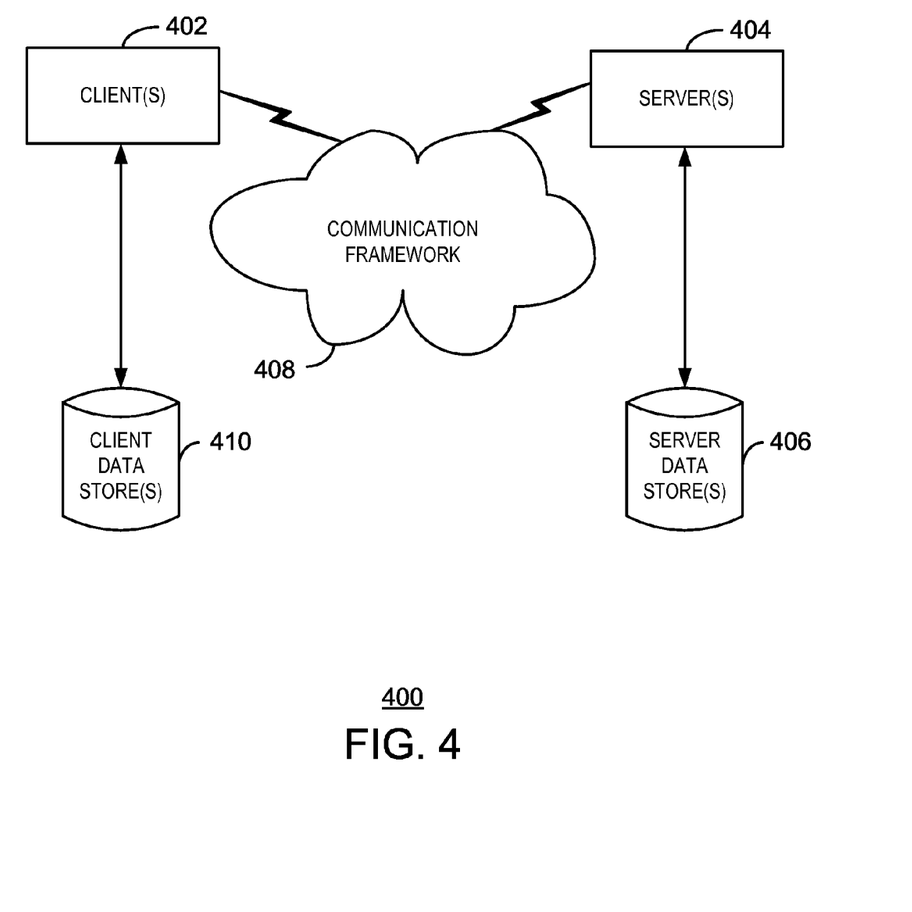
FIG. 4 is a block diagram of an exemplary networking environment for implementing various aspects of the claimed subject matter.

FIG. 4 is a block diagram of an exemplary networking environment 400 wherein aspects of the claimed subject matter can be employed. Moreover, the exemplary networking environment 400 may be used to implement a system and method that resolves a classification problem with noisy judgments.

The networking environment 400 includes one or more client(s) 402. The client(s) 402 can be hardware and/or software (e.g., threads, processes, computing devices). As an example, the client(s) 402 may be judge devices 104, providing access to server 102, over a communication framework 408, such as the Internet.

The environment 400 also includes one or more server(s) 404. The server(s) 404 can be hardware and/or software (e.g., threads, processes, computing devices). The server(s) 404 may include server device 106. The server(s) 404 may be accessed by the client(s) 402.

One possible communication between a client 402 and a server 404 can be in the form of a data packet adapted to be transmitted between two or more computer processes. The environment 400 includes a communication framework 408 that can be employed to facilitate communications between the client(s) 402 and the server(s) 404.

The client(s) 402 are operably connected to one or more client data store(s) 410 that can be employed to store information local to the client(s) 402. The client data store(s) 410 may be located in the client(s) 402, or remotely, such as in a cloud server. Similarly, the server(s) 404 are operably connected to one or more server data store(s) 406 that can be employed to store information local to the servers 404.

Figure 5:
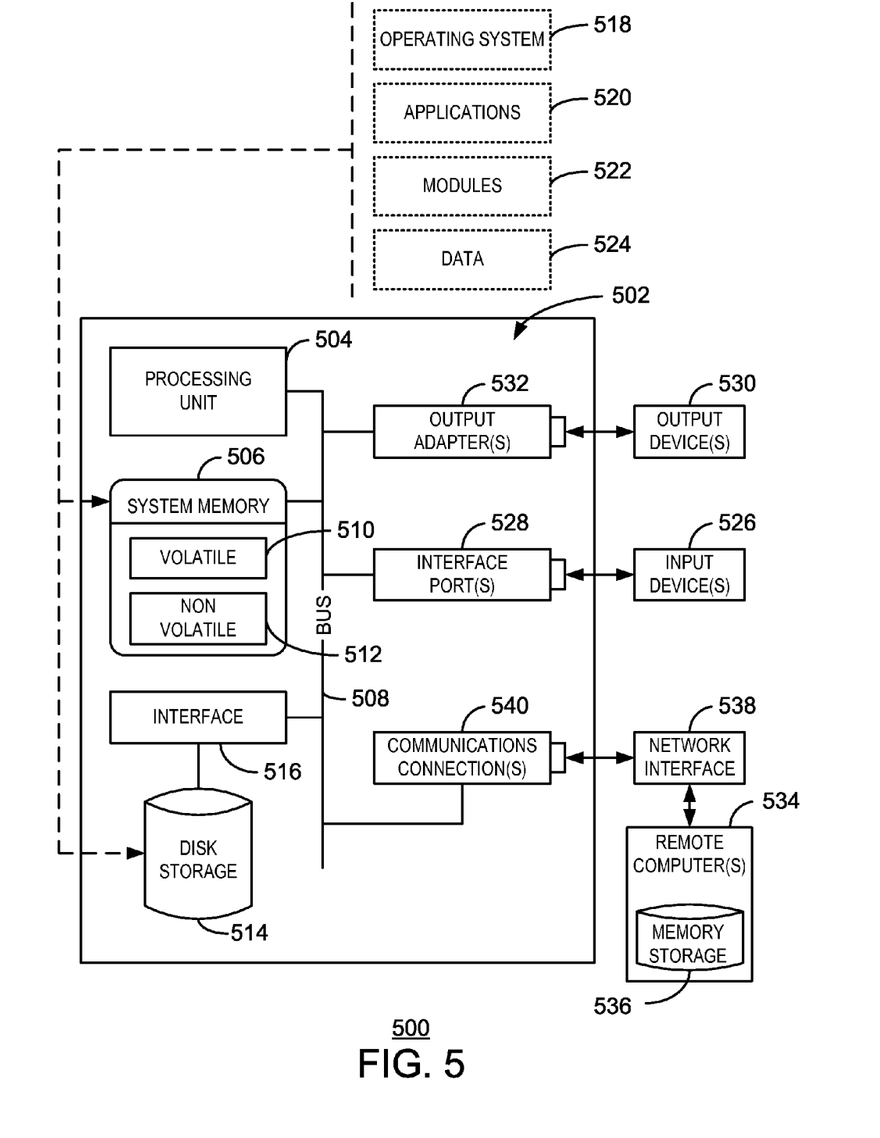
FIG. 5 is a block diagram of an exemplary operating environment for implementing various aspects of the claimed subject matter.

With reference to FIG. 5, an exemplary operating environment 500 is shown for implementing various aspects of the claimed subject matter. The exemplary operating environment 500 includes a computer 502. The computer 502 includes a processing unit 504, a system memory 506, and a system bus 508.

The system bus 508 couples system components including, but not limited to, the system memory 506 to the processing unit 504. The processing unit 504 can be any of various available processors. Dual microprocessors and other multiprocessor architectures also can be employed as the processing unit 504.

The system bus 508 can be any of several types of bus structure(s) including the memory bus or memory controller, a peripheral bus or external bus, and/or a local bus using any variety of available bus architectures known to those of ordinary skill in the art. The system memory 506 comprises non-transitory computer-readable storage media that includes volatile memory 510 and nonvolatile memory 512.

The basic input/output system (BIOS), containing the basic routines to transfer information between elements within the computer 502, such as during start-up, is stored in nonvolatile memory 512. By way of illustration, and not limitation, nonvolatile memory 512 can include read only memory (ROM), programmable ROM (PROM), electrically programmable ROM (EPROM), electrically erasable programmable ROM (EEPROM), or flash memory.

Volatile memory 510 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SyncLink™ DRAM (SLDRAM), Rambus® direct RAM (RDRAM), direct Rambus® dynamic RAM (DRDRAM), and Rambus® dynamic RAM (RDRAM).

The computer 502 also includes other non-transitory computer-readable media, such as removable/non-removable, volatile/non-volatile computer storage media. FIG. 5 shows, for example a disk storage 514. Disk storage 514 includes, but is not limited to, devices like a magnetic disk drive, floppy disk drive, tape drive, Jaz drive, Zip drive, LS-100 drive, flash memory card, or memory stick.

In addition, disk storage 514 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 514 to the system bus 508, a removable or non-removable interface is typically used such as interface 516.

It is to be appreciated that FIG. 5 describes software that acts as an intermediary between users and the basic computer resources described in the suitable operating environment 500. Such software includes an operating system 518. Operating system 518, which can be stored on disk storage 514, acts to control and allocate resources of the computer system 502.

System applications 520 take advantage of the management of resources by operating system 518 through program modules 522 and program data 524 stored either in system memory 506 or on disk storage 514. It is to be appreciated that the claimed subject matter can be implemented with various operating systems or combinations of operating systems.

A user enters commands or information into the computer 502 through input device(s) 526. Input devices 526 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and the like. The input devices 526 connect to the processing unit 504 through the system bus 508 via interface port(s) 528. Interface port(s) 528 include, for example, a serial port, a parallel port, a game port, and a universal serial bus (USB).

Output device(s) 530 use some of the same type of ports as input device(s) 526. Thus, for example, a USB port may be used to provide input to the computer 502, and to output information from computer 502 to an output device 530.

Output adapter 532 is provided to illustrate that there are some output devices 530 like monitors, speakers, and printers, among other output devices 530, which are accessible via adapters. The output adapters 532 include, by way of illustration and not limitation, video and sound cards that provide a means of connection between the output device 530 and the system bus 508. It can be noted that other devices and systems of devices provide both input and output capabilities such as remote computer(s) 534.

The computer 502 can be a server hosting various software applications in a networked environment using logical connections to one or more remote computers, such as remote computer(s) 534. The remote computer(s) 534 may be client systems configured with web browsers, PC applications, mobile phone applications, and the like.

The remote computer(s) 534 can be a personal computer, a server, a router, a network PC, a workstation, a microprocessor based appliance, a mobile phone, a peer device or other common network node and the like, and typically includes many or all of the elements described relative to the computer 502.

For purposes of brevity, only a memory storage device 536 is illustrated with remote computer(s) 534. Remote computer(s) 534 is logically connected to the computer 502 through a network interface 538 and then connected via a wireless communication connection 540.

Network interface 538 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 540 refers to the hardware/software employed to connect the network interface 538 to the bus 508. While communication connection 540 is shown for illustrative clarity inside computer 502, it can also be external to the computer 502. The hardware/software for connection to the network interface 538 may include, for exemplary purposes only, internal and external technologies such as, mobile phone switches, modems including regular telephone grade modems, cable modems and DSL modems, ISDN adapters, and Ethernet cards.

An exemplary processing unit 504 for the server may be a computing cluster comprising Intel® Xeon CPUs. The disk storage 514 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for determining a plurality of inferred labels, for a corresponding plurality of items, wherein the inferred labels are generated from a plurality of judgments, wherein multiple judges select the judgments from a specified choice of labels for each of the items, the method comprising:
   determining a true label for each of the items based on the judgments;
   determining a characterization of labeling expertise for each judge based on the judgments;
   determining a labeling difficulty for each item based on the judgments;
   determining, using maximum entropy, a probability distribution over the specified choice of labels for each judge and item;
   selecting a plurality of improved labels for the items from the specified choice of labels such that the entropy over the probability distribution is reduced, wherein the improved labels represent an improvement from the judgments toward the true labels; and
   perform an iterative procedure wherein the true labels, the characterizations of labeling expertise, and the labeling difficulties are determined.

2. The method of claim 1, wherein an expertise of each judge represents a relative expertise in relation to all other judges.

3. The method of claim 2, wherein the expertise is independent of any item a judge labels.

4. The method of claim 1, wherein the labeling difficulty for each of the items represents a relative difficulty in comparison to all other items.

5. The method of claim 4, wherein the labeling difficulty for each of the items is independent of any judge labeling an item.

6. The method of claim 1, wherein the judgments comprise noisy recommendations whether to buy each of a set of stocks, and wherein the judges comprise a plurality of financial analysts.

7. The method of claim 1, wherein the judgments comprise noisy measurements of an electro-mechanical systems, and wherein the judges comprise a bank of noisy sensors.

8. The method of claim 1, wherein the judgments are crowdsourced, and wherein the judges comprise a crowd.

9. The method of claim 1, wherein each of the judges selects the judgments for a portion of the items, and wherein judgments of each of the judges overlap with judgments of at least one other judge.

10. The method of claim 1, wherein the specified choice of labels comprises one of:
    categorical data;
    consecutive ratings; and
    real-valued numbers.

11. The method of claim 1, wherein available contextual information for items or workers is used to improve a prediction accuracy of the improved labels with respect to the true labels.

12. The system of claim 11, wherein the iterative analysis can be initialized by selecting a plurality of labels from the judgments based on a majority vote process.

13. The system of claim 11, comprising code configured to direct the processor to select the initial labels from the judgments.

14. The system of claim 11, wherein an expertise of each judge represents a relative expertise in relation to all other judges, and wherein the expertise is independent of any item a judge labels.

15. The system of claim 11, wherein the labeling difficulty for each of the items represents a relative difficulty in comparison to all other items, and wherein the labeling difficulty for each of the items is independent of any judge labeling an item.

16. The method of claim 1, wherein the judges comprise one of:
    a machine configured to provide the judgments; or
    a machine comprising an algorithm configured to provide the judgments.

17. The method of claim 1, wherein a probability distribution over the specified choice of labels for each judge and item comprise other forms in exponential family.

18. The method of claim 1, wherein prior information over labeling difficulties or labeling expertise is used to improve a prediction accuracy of the improved labels with respect to the true labels.

19. A system for determining a plurality of inferred labels, for a corresponding plurality of items, wherein the inferred labels are generated from a plurality of judgments, wherein multiple judges select the judgments from a specified choice of labels for each of the items, comprising:
    a processing unit; and
    a system memory, wherein the system memory comprises code configured to direct the processing unit to:
       determine a true label for each of the items based on the judgments;
       determine a characterization of labeling expertise for each judge based on the judgments;
       determine a labeling difficulty for each item based on the judgments;
       determine, using maximum entropy, a probability distribution over the specified choice of labels for each judge and item;
       selecting a plurality of improved labels for the items from the specified choice of labels such that the entropy over the probability distribution is reduced, wherein the improved labels represent an improvement from the judgments toward the true labels; and perform iterative procedure wherein the true labels, characterizations of judge expertise, and the labeling difficulties are determined.

20. One or more computer-readable storage media for determining a plurality of inferred labels, for a corresponding plurality of items, wherein the inferred labels are generated from a plurality of judgments, wherein multiple judges select the judgments from a specified choice of labels for each of the items, the computer-readable storage media comprising code configured to direct a processing unit to:

determine a true label for each of the items based on the judgments;

determine a characterization of labeling expertise for each of the judges based on the judgments, wherein the expertise of each judge represents a relative expertise in relation to all other judges, and wherein the expertise is independent of any item a judge labels;

determine a labeling difficulty for each of the items based on the judgments, wherein the labeling difficulty for each of the items represents a relative difficulty in comparison to all other items, and wherein the labeling difficulty for each of the items is independent of any judge labeling an item;

determine, using maximum entropy, a probability distribution over the specified choice of labels for each judge and item, based on the judgments;

select a plurality of improved labels for the items from the specified choice of labels such that the entropy over the probability distribution is reduced, wherein the improved labels represent an improvement from the judgments toward the true labels; and perform an iterative procedure wherein the true labels, the characterizations of labeling expertise, and the labeling difficulties are determined.

* * * * *